UNITED STATES PATENT OFFICE 2,459,746

HEAT STABILIZATION OF VINYLIDENE CHLORIDE RESINS

Milton R. Radcliffe, Glen Rock, N. J., assignor to The Firestone Tire & Rubber Company, Akron, Ohio, a corporation of Ohio No Drawing. Application April 9, 1945, Serial No. 587,438

13 Claims. (Cl. 260—86)

This invention relates to the heat stabilization of vinylidene chloride resins in the presence of iron and its compounds.

A serious inconvenience attending the fabrication of vinylidene chloride polymer and copolymer resins has been their tendency to decompose when heated in the presence of even traces of iron or its compounds. The absolute exclusion of iron from resins entering fabrication processes is well-nigh impossible; in fact, the quantities of iron picked up under the best of conditions in normal manufacture appear (in the light of the disclosure hereinbelow) to substantially reduce the maximum temperatures at which vinylidene chloride resins may be fused. Occasionally, moreover, the manufacturers will produce a "bad" lot of resin, containing so much iron that the fabrication thereof is difficult or even impossible. Likewise, it would often be advantageous to incorporate iron-containing pigments into vinylidene chloride resins, if it were not for the sensitivity of the resins to such pigments.

The difficulties occasioned by the presence of iron are accentuated when it is sought to rework any substantial proportion of vinylidene chloride resin scrap which has passed through any fusion or other heating stages of the fabrication processes. Such scrap will inevitably have picked up iron by corrosion of equipment and from other sources, but must nevertheless be fused at higher than usual temperatures in order to effect a smooth blending thereof.

A further difficulty resulting from the iron-sensitivity of vinylidene chloride resins is the necessity for using highly corrosion resistant materials for the extrusion apparatus, molds etc. with which the fused resins come in contact. Such corrosion resistant materials are expensive, difficult to machine, and easily broken in use.

Accordingly it is an object of this invention to stabilize vinylidene chloride resins against deterioration by heat in the presence of iron and its compounds.

Another object is to increase the temperature at which commercial vinylidene chloride resins may safely and reliably be fused.

Another object is to make possible the use of higher temperatures in the remelting of vinylidene chloride resin scrap.

A further object is to make possible the use of iron-containing pigments in vinylidene chloride resins.

A still further object is to render feasible the working of vinylidene chloride resins in molds, extruders, etc. constructed from only moderately corrosion-resistant materials, or even from ordinary iron and steel alloys.

A still further object is to accomplish the foregoing objects by the addition, to vinylidene chloride resins, of suitable and readily compatible stabilizing substances.

The present invention is based on the discovery that vinylidene chloride polymer and copolymer resins may be stabilized, against iron-catalyzed heat deterioration, by the incorporation thereinto of certain polyhydric alcohols and derivatives as follows:

1. Polyglycols.
2. Polyhydroxy alcohols containing three or more hydroxyl groups.
3. Condensation products of polyhydric alcohols containing three or more hydroxyl groups, both with themselves and with glycols and polyglycols.
4. Partial ethers and esters of any of the compounds indicated under the preceding items 1–3.

Vinylidene chloride resins containing small proportions of any of the foregoing substances may be fused at very high temperatures, even in the presence of gross amounts of iron and iron compounds, without decomposition. By way of contrast, vinylidene chloride polymers containing as little as .01% of iron impurities deteriorate rapidly at temperatures as low as 160° C.

Resins which may be stabilized in accordance with the present invention include the polymers of vinylidene chloride, and copolymers thereof with minor proportions of other unsaturated compounds copolymerizable therewith such as vinyl halides on the order of vinyl chloride, vinyl bromide and the like; vinyl esters such as vinyl acetate, vinyl chloroacetate, vinyl butyrate, etc.; acrylonitrile and its derivatives; styrene and its polymerizable derivatives such as chlorostyrene, polychlorostyrene, methyl styrene and the like; acrylic esters such as methyl methacrylate, ethyl acrylate and the like; doubly unsaturated compounds such as butadiene, isoprene, chloroprene and the like; and vinyl ethers and ketones and the sulfur analogs thereof such as vinyl ethyl ether, vinyl isobutyl sulfide, vinyl methyl ketone and the like. Any of the polymers and copolymers above indicated, providing they contain a sufficient quantity of the elements of vinylidene chloride (say about 25%, based on the total weight of resin) to introduce a substantial element of thermal instability in the presence of iron and its compounds, may be greatly improved by the addition of stabilizing compounds in accordance with this invention. These polymers of vinylidene chloride alone and its copolymers are herein referred to as "polymeric vinylidene chloride products."

As above indicated, the thermal instability which it is sought by this invention to overcome is that due to the presence of iron or its compounds. However, it is almost impossible to prepare or process polymeric vinylidene chloride products without introducing an amount of iron sufficient to measurably reduce the thermal stability thereof, and in no case can a commercial process be relied upon to infallibly exclude the adventitious addition of gross quantities of iron. Accordingly it is desirable to add stabilizers in accordance with this invention to polymeric vinylidene chloride products in which the presence of excessive quantities of iron is not actively suspected, particularly since analysis of a small sample of a large lot of resin would by no means assure the absence of iron elsewhere in the lot. Such precautionary addition of stabilizers is therefore to be considered within the ambit of this invention.

Coming now to the stabilizing polyhydric alcohol compounds to be used in accordance with this invention, the chemical criteria of suitability of these compounds appears to be the presence therein of several hydroxyl groups, or of at least one hydroxyl group and a plurality of oxygenated linkages such as ether and ester groups. Without absolute commitment to this theory, it is believed that these stabilizing compounds sequester, in the form of harmless complexes, any iron compounds which may be present.

Referring to the polyglycols noted hereinabove in paragraph (1) as being suitable stabilizers for use in the practice of this invention, the simple glycols would probably meet the chemical criteria outlined in the preceding paragraph, and thus, so far as concerns the chemical aspects of stabilization according to this invention, ethylene glycol would doubtless be operative. However, in addition to the chemical criteria, there remain practical considerations of compatibility and non-volatility under the usual conditions of fabrication of vinylidene chloride polymers. Due to their volatility, the simple glycols cannot be used, and it becomes necessary to employ polymers thereof such as diethylene glycol, triethylene glycol, tetraethylene glycol, pentaethylene glycol, and condensation products involving other alkylene glycols such as dipropylene glycol, ethylene propylene glycol, tripropylene glycol, tetrapropylene glycol and the like. All of these compounds, when incorporated in suitable small proportions into vinylidene chloride resins, effect a very satisfactory stabilization thereof in the presence of iron or its compounds.

Reverting to the polyhydroxy alcohols containing three or more hydroxy groups noted above under paragraph (2), suitable materials of this sort include glycerine, pentaerythritol, mannitol, sorbitol and the like. In all of these compounds the hydroxyl groups must be either primary or secondary, as any tertiary hydroxyl groups introduce an element of heat-instability into the stabilizer itself which would preclude its use as a stabilizer in accordance with this invention.

As noted above under paragraph (3), there may be employed condensation products of polyhydric alcohols containing three or more hydroxy groups. Examples of such compounds are diglycerol, triglycerol, and glycol ethers of glycerine, pentaerythritol, mannitol, etc.

Likewise suitable as stabilizers in accordance with this invention are the partial ethers and esters of any of the compounds above listed, such etherification and esterification being, as indicated by the term "partial," limited so as to leave at least one free hydroxyl group in the final compound. In the case of the esters, the esterifying acid may advantageously itself contain a hydroxyl group, such hydroxy acids being exemplified in lactic, tartaric, citric, citraconic, etc., acids. Examples of stabilizers coming under this classification are triethylene glycol citrate, diethylene glycol tartrate, triethylene glycol glycolate, pentaerythritol ethers of ethylene glycol, sorbitol monoglycolate, etc.

The amount of stabilizing agents to be added to polymeric vinylidene chloride products in accordance with this invention will vary widely in accordance with the severity of the decomposing influences to which the resin is proposed to be subjected; i. e., more stabilizing agent will be added where it is expected that extreme high temperatures will be encountered, or when excessive contamination of iron is anticipated. Based on the weight of polymeric vinylidene chloride products, the addition of as little as 0.05% of any of the stabilizers above indicated as suitable measurably enhances the stability of the resin against deterioration by heat in the presence of iron and its compounds. Ordinarily between 0.1 and about 2.0% of the stabilizer will be used, and may be relied upon to protect the resin against the most drastic deteriorating influences likely to be encountered. More of the stabilizer may be added, but will ordinarily be found wasteful.

As briefly noted above, the addition of stabilizers in accordance with this invention is useful from several standpoints. First, the addition will be useful in the processing of ordinary commercial resins, regardless of whether trouble is expected due to iron-catalyzed deterioration, simply as a precautionary measure to insure against possible local occurrence of iron in otherwise pure resins as received from the manufacturer. Likewise contamination by iron may accidentally occur in the plant of the fabricator. Still further, even the purest of commercial polymeric vinylidene chloride products contain traces of iron, and the addition of stabilizers in accordance with the present invention raises the temperature at which these resins may be consistently worked.

In molding and extruding operations there inevitably is produced a quantity of scrap, usually running as high as 10%. The recycling of this material, either alone or mixed with new resin, requires the use of higher than ordinary fusing temperatures in order to effect a complete blending. The higher temperatures and increased likelihood of iron contamination render the practice of this invention most desirable where recycling of scrap is practiced.

Likewise it may be desired to incorporate iron pigments such as yellow iron oxide, iron oxide reds, etc., into polymeric vinylidene chloride products, since these pigments are extremely cheap and are capable of producing shades not otherwise obtainable. So far as the applicant patentee is aware, the use of such pigments has been impossible prior to the present invention, by reason of decomposition of the resin brought about by incorporation of iron pigments.

Molten vinylidene chloride resins are extremely corrosive to iron, steel and other cheap ferrous materials of construction. The corrosion seems to be cumulatively autocatalytic, iron salts liberated in the early stages of corrosion catalyzing the evolution of hydrochloric acid from the resin, the hydrochloric acid in turn reacting with the ferrous metal to yield further quantities of iron compounds, and so on, at a progressively increasing rate. This corrosive action has heretofore necessitated the use of highly corrosion resistant alloys in molds, dies, extrusion machines, etc. for vinylidene chloride resins, which alloys are expensive, difficult to fabricate, and very fragile. The incorporation of stabilizers according to this invention into polymeric vinylidene chloride products inhibits the catalysis, by iron compounds, of hydrogen chloride liberation from the resins, whose corrosive action is thereby rendered simple and non-progressive. Resins stabilized in accordance with this invention may therefore be processed in equipment of relatively less corrosion resistant materials, such as stainless steel, or even simple carbon steels and iron.

With the foregoing general discussion in mind, there are given herewith detailed formal examples of the practice of this invention. All parts given are by weight.

EXAMPLE I

Vinylidene chloride-vinyl chloride resin
(a copolymer of 95% vinylidene chloride and 5% vinyl chloride) _____ 1,000
Yellow iron oxide pigment _____ 5
Heat stabilizer (mannitol, sorbitol, etc., per Table I below) _____ 20 or 50

In order to demonstrate, on a reproducible test basis, the heat-stabilizing effect obtainable by the practice of this invention, a series of compositions was made up in accordance with the foregoing schedule. In the absence of stabilizers, the quantity of yellow iron oxide pigment employed would cause immediate decomposition of the resin if it were attempted to melt and extrude the same. In each case, the resin and pigment were ball-milled together in dry state. The mixture was then moistened with acetone, and the selected heat stabilizer ground into the moistened mass by means of a mortar. The mix was then dried at 60° C. for 18 hours, and extruded as a filament .01" in diameter in a laboratory extruder, in which the barrel was maintained at 150° C. and the nozzle at 170° C. The characteristics of the fibers extruded from each composition were noted, and at the conclusion of the run on each batch, the extruder was cleaned and the condition of the surfaces thereof noted. Tabulated herewith are the types and amounts of stabilizers incorporated into the several compositions, together with the properties of the filaments extruded from each composition and the condition of the interior of the barrel of the extruder after the extrusion of each composition.

Table I

| Stabilizer | | | | |
|---|---|---|---|---|
| Type | Parts per 1,000 parts resin | Properties of Filament | Condition of Extruder Barrel After Run | Run No. |
| Mannitol | 20 | clear, smooth, hard | slightly dirty | 1 |
|  | 50 | do | clean | 2 |
| Sorbitol | 20 | clear, smooth | slightly dirty | 3 |
|  | 50 | hard | clean | 4 |
| Tetraethylene glycol | 20 | clear, smooth, hard | slightly dirty | 5 |
|  | 50 | soft, clear | do | 6 |
| Pentaerythritol | 50 | hard, few spots | dirty | 7 |
| Glycerin | 50 | soft, few spots | fairly clean | 8 |
| Mannitol monoglycolate | 50 | clear, smooth, medium hard | do | 9 |
| Sorbitol monoacetate | 50 | do | do | 10 |
| Control | 0 | Resin immediately decomposed and could not be extruded. | | 11 |

From the foregoing table, it will be apparent that the higher straight-chain polyhydroxy alcohols and their partial derivatives (items 1–4, 9 and 10) are preferred stabilizers. However, it should be borne in mind that the test was carried out in the presence of gross contamination by iron, and even the less excellent showing of the other stabilizers is therefore quite remarkable.

EXAMPLE II

*Extrusion of defective lot of vinylidene chloride resin*

A carload lot of vinylidene chloride resin was received from the manufacturer, which resin it was found impossible to extrude commercially into fibers, due to frequent breaks, fouling of the extruder barrel and nozzle, local scorching of the filament etc. apparently due to excessive iron content. The manufacturer agreed that the material was unworkable.

This defective material was then compounded as follows:

Parts

Defective vinylidene chloride resin (a ready-plasticized, olive-drab pigmented vinylidene chloride-vinyl chloride copolymer resin, containing about 95% vinylidene chloride) _____ 100
Mannitol _____ 5

The foregoing materials were blended in a ball mill and extruded in a commercial extruder at 330° F. to form filaments which, after being quenched and stretch-oriented to about four times their extruded length, had a diameter of .012". The extruders operated upon the entire carload lot with no more than the usual number of breaks, and the product filaments were of acceptable commercial quality.

EXAMPLE III

A composition was made up similar to that in Example II, with the exception that a good commercial grade of vinylidene chloride resin (Saran B-115, manufactured by the Dow Chemical Co.) was extruded in a commercial extruder as described in Example II. Appreciably less trouble from breaks, etc., was encountered with the composition containing mannitol than is usual with compositions not containing mannitol. Similar excellent results were obtained with the use of sorbitol, tetraethylene glycol and other stabilizers of the class described in this application.

EXAMPLE IV

|  | Parts |
|---|---|
| Vinylidene chloride resin | 100 |
| Mannitol | 5 |
| Scrap oriented vinylidene chloride fiber | 10 |

The above composition was extruded at 345° F. in a commercial extruder to yield fibers .012" in diameter when oriented. The somewhat elevated temperature was required to effect fusion of the somewhat refractory oriented fibers. The extruder operated commercially without any unusual number of breaks and yielded a commercially acceptable product.

EXAMPLE V

|  | Parts |
|---|---|
| Vinylidene chloride resin | 100 |
| Yellow iron oxide | 0.5 |
| Sorbitol | 0 or 5 |

Two batches were made up in accordance with the foregoing schedule, one containing sorbitol and one not containing sorbitol. Each batch was molded to a plaque 6" x 6" x ⅛" between steel platens in a Carver laboratory press at 200° C. for three minutes. The plaque from the batch containing sorbitol was clear, while the plaque from the batch containing no sorbitol was badly scorched.

EXAMPLE VI

|  | Parts |
|---|---|
| Vinylidene chloride resin | 100 |
| Tetraethylene glycol | 0.1 |

The foregoing ingredients were ball milled together, and the mixture was extruded in a plunger type extruder having a stainless steel barrel and having a die provided with .001" openings suitable for extruding hosiery gauge yarn. The extruder barrel was maintained at 175° C., and the material was successfully extruded and oriented, to form acceptable hosiery filaments. In extruding the same resin in the absence of the tetraethylene glycol it had previously been found necessary to employ a barrel made of a very brittle ferrous alloy containing silicon. The alloy cannot be machined, but must be ground to shape, adding greatly to the cost of any apparatus manufactured therefrom. The advantage of the present invention, which enables the use of less corrosion resistant equipment, is evident.

The above results were also obtained with the use of sorbitol, mannitol, and other stabilizers of the class described in this application.

From the foregoing general discussion and detailed specific examples, it will be evident that this invention provides a means for reliably preventing the deterioration of vinylidene chloride resins by heat due to the presence of iron. The stabilizers of this invention permit the use of iron pigments in vinylidene chloride resins, a highly desirable object not heretofore attained. Likewise, the stabilizers of this invention substantially reduce the corrosion problems connected with apparatus used in the fabrication of vinylidene chloride resins.

To recapitulate, the following specific compounds have been set forth hereinabove as being suitable for use as stabilizers in accordance with this invention.

Table II

| | |
|---|---|
| Mannitol | Diglycerol |
| Sorbitol | Triglycerol |
| Tetraethylene glycol | Glycol ether of glycerin |
| Pentaerythritol | Glycol ether of pentaerythritol |
| Glycerin | Glycol ether of mannitol |
| Mannitol monoglycolate | Triethylene glycol citrate |
| Sorbitol monoacetate | Diethylene glycol lactate |
| Diethylene glycol | Triethylene glycol citrate |
| Triethylene glycol | Diethylene glycol lactate |
| Tetraethylene glycol | Triethylene glycol glycolate |
| Dipropylene glycol | Sorbitol monoglycolate |
| Ethylene propylene glycol | |

What is claimed is:

1. A composition stable against deterioration by heat in the presence of iron and compounds thereof, said composition comprising mutually incorporated a polymeric vinylidene chloride product, together with from .05% to 2.0%, based on the weight of polymeric vinylidene chloride product, of a stabilizing substance selected from the group consisting of those set forth in Table II hereinabove.

2. A composition stable against deterioration by heat in the presence of iron and compounds thereof, said composition comprising mutually incorporated a polymeric vinylidene chloride product, together with from 0.1% to 2.0%, based on the weight of polymeric vinylidene chloride product of mannitol.

3. A composition stable against deterioration by heat in the presence of iron and compounds thereof, said composition comprising mutually incorporated a polymeric vinylidene chloride product, together with from 0.1% to 2.0%, based on the weight of polymeric vinylidene chloride product of sorbitol.

4. A composition stable against deterioration by heat in the presence of iron and compounds thereof, said composition comprising mutually incorporated a polymeric vinylidene chloride product, together with from 0.1% to 2.0%, based on the weight of polymeric vinylidene chloride product of tetraethylene glycol.

5. A heat stable composition comprising mutually incorporated an iron oxide pigment, a polymeric vinylidene chloride product, and from 0.1% to 2.0%, based on the weight of polymeric vinylidene chloride product of a substance selected from the group consisting of those set forth in Table II hereinabove.

6. Process which comprises fusing together at 150° C. a polymeric vinylidene chloride product, together with from .05% to 2.0%, based on the weight of polymeric vinylidene chloride product of a substance selected from the group consisting of those set forth in Table II hereinabove.

7. Process which comprises fusing together at 150° C. an iron oxide pigment, a polymeric vinylidene chloride product, and from 0.1% to 2.0%, based on the weight of polymeric vinylidene chloride product of a substance selected from the group consisting of those set forth in Table II hereinabove.

8. Process which comprises extruding at 150° C., in iron apparatus, a polymeric vinylidene chloride product, said resin containing from 0.1% to 2.0%, based on the weight of polymeric vinylidene chloride product of a substance selected from the group consisting of those set forth in Table II hereinabove.

9. A composition stable against deterioration by heat in the presence of iron and compounds thereof, said composition comprising mutually incorporated a copolymer of 95% of vinylidene chloride with 5% of vinyl chloride, together with from 0.1% to 2.0% of mannitol.

10. A composition stable against deterioration by heat in the presence of iron and compounds thereof, said composition comprising mutually incorporated a copolymer of 95% of vinylidene chloride with 5% of vinyl chloride, together with from 0.1% to 2.0% of sorbitol.

11. A composition stable against deterioration by heat in the presence of iron and compounds thereof, said composition comprising mutually incorporated a copolymer of 95% of vinylidene chloride with 5% of vinyl chloride, together with from 0.1% to 2.0% of tetraethylene glycol.

12. A heat stable composition comprising mutually incorporated an iron oxide pigment, a copolymer of 95% of vinylidene chloride with 5% of vinyl chloride, and from 0.1 to 2.0% of tetraethylene glycol.

13. Process which comprises extruding, at 150° C., in iron apparatus, a copolymer of 95% vinylidene chloride with 5% of vinyl chloride mutually incorporated with 0.1 to 2.0% of tetraethylene glycol.

MILTON R. RADCLIFFE.

REFERENCES CITED

The following references are of record in the file of this patent:

UNITED STATES PATENTS

| Number | Name | Date |
|---|---|---|
| 1,936,093 | Lawson | Nov. 21, 1933 |
| 2,160,938 | Reilly | June 6, 1939 |
| 2,205,449 | Wiley | June 25, 1940 |
| 2,215,379 | Sebrell | Sept. 17, 1940 |
| 2,232,933 | Wiley | Feb. 25, 1941 |